(12) United States Patent
Matsuo et al.

(10) Patent No.: US 10,268,764 B2
(45) Date of Patent: Apr. 23, 2019

(54) LADDER PROGRAM EDITING DEVICE CAPABLE OF DISPLAYING NETWORK COMMENT

(71) Applicant: FANUC Corporation, Yamanashi (JP)

(72) Inventors: Toshiyuki Matsuo, Yamanashi (JP); Mitsuru Mochizuki, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 186 days.

(21) Appl. No.: 15/185,058

(22) Filed: Jun. 17, 2016

(65) Prior Publication Data

US 2016/0378866 A1 Dec. 29, 2016

(30) Foreign Application Priority Data

Jun. 29, 2015 (JP) ................................. 2015-129627

(51) Int. Cl.
*G06F 17/30* (2006.01)
*H04L 29/08* (2006.01)

(52) U.S. Cl.
CPC .. *G06F 17/30864* (2013.01); *G06F 17/30554* (2013.01); *H04L 67/02* (2013.01)

(58) Field of Classification Search
CPC ........................................... G05B 2219/13052
USPC ........................................................ 707/600
See application file for complete search history.

(56) References Cited

U.S. PATENT DOCUMENTS

| | | | | |
|---|---|---|---|---|
| 4,488,258 A | * | 12/1984 | Struger | G05B 19/056 700/18 |
| 7,603,183 B1 | * | 10/2009 | Munemoto | G05B 19/05 700/17 |
| 2004/0117773 A1 | * | 6/2004 | Nicolle | G05B 19/056 717/136 |
| 2004/0230322 A1 | * | 11/2004 | Oka | G05B 19/056 700/18 |
| 2005/0222697 A1 | * | 10/2005 | Inoue | G05B 19/0426 700/87 |
| 2006/0089728 A1 | * | 4/2006 | Maeda | G05B 19/056 700/18 |
| 2010/0278453 A1 | | 11/2010 | King | |
| 2014/0304551 A1 | * | 10/2014 | Nakai | G06F 11/3692 714/38.1 |
| 2016/0267001 A1 | * | 9/2016 | Yonekura | G05B 19/056 |

FOREIGN PATENT DOCUMENTS

| | | |
|---|---|---|
| CN | 1763669 A | 4/2006 |
| CN | 101765840 A | 6/2010 |
| JP | 4-319702 A | 11/1992 |

(Continued)

OTHER PUBLICATIONS

Notice of Grounds for Rejection in JP Application No. 2015-129627, dated Jun. 20, 2017.

(Continued)

*Primary Examiner* — Cheyne D Ly
(74) *Attorney, Agent, or Firm* — Hauptman Ham, LLP (57) ABSTRACT

A ladder program editing device extracts a ladder circuit satisfying a search condition for searching a ladder program based on the search condition designated by a user and a network comment associated with the extracted ladder circuit. When the extracted ladder circuit is displayed, the network comment extracted together is displayed on a screen in a form associated with the ladder circuit.

3 Claims, 7 Drawing Sheets

(56) References Cited

FOREIGN PATENT DOCUMENTS

| | | | |
|---|---|---|---|
| JP | 7-210218 A | 8/1995 |
| JP | H10320424 A | 12/1998 |
| JP | 2003295911 A | 10/2003 |
| JP | 2003-316404 A | 11/2003 |
| JP | 2005092807 A | 4/2005 |
| JP | 2005-316986 A | 11/2005 |
| JP | 2011-86118 A | 4/2011 |

OTHER PUBLICATIONS

Office Action in CN Application No. 201610493484.7, dated Apr. 25, 2018, 14 pp.

* cited by examiner

LADDER PROGRAM EDITING DEVICE CAPABLE OF DISPLAYING NETWORK COMMENT

RELATED APPLICATIONS

The present application claims priority to Japanese Patent Application Number 2015-129627, filed Jun. 29, 2015, the disclosure of which is hereby incorporated by reference herein in its entirety.

BACKGROUND OF THE INVENTION

1. Field of the Invention

The present invention relates to a ladder program editing device, and more particularly to a ladder program editing device having a function of displaying a network comment on a search result display screen.

2. Description of the Related Art

An explanatory note of processing content may be added to a position in which it is appropriate for delimiting a process of a ladder program, and the explanatory note can be added in order to facilitate understanding of ladder processing content when the ladder program is viewed later or when the ladder program is viewed by a third party.

Typically, the ladder program is often created such that one function is implemented through several to several tens of lines of ladder circuits. For this reason, a technique of facilitating understanding of processing content by adding a tag or a comment to a ladder circuit and describing processing content of consecutive ladder circuits in order to help with understanding has been proposed (for example, see JP 10-320424 A and JP 2005-092807 A).

Further, an editing method of registering information such as a symbol or a comment at an address of each contact point in advance, displaying the information such as the symbol or the comment set to the address of each contact point through a sub screen, and making efficient a creation of a sequence program and an editing work has been proposed (for example, see JP 2003-295911 A).

Figure 7:
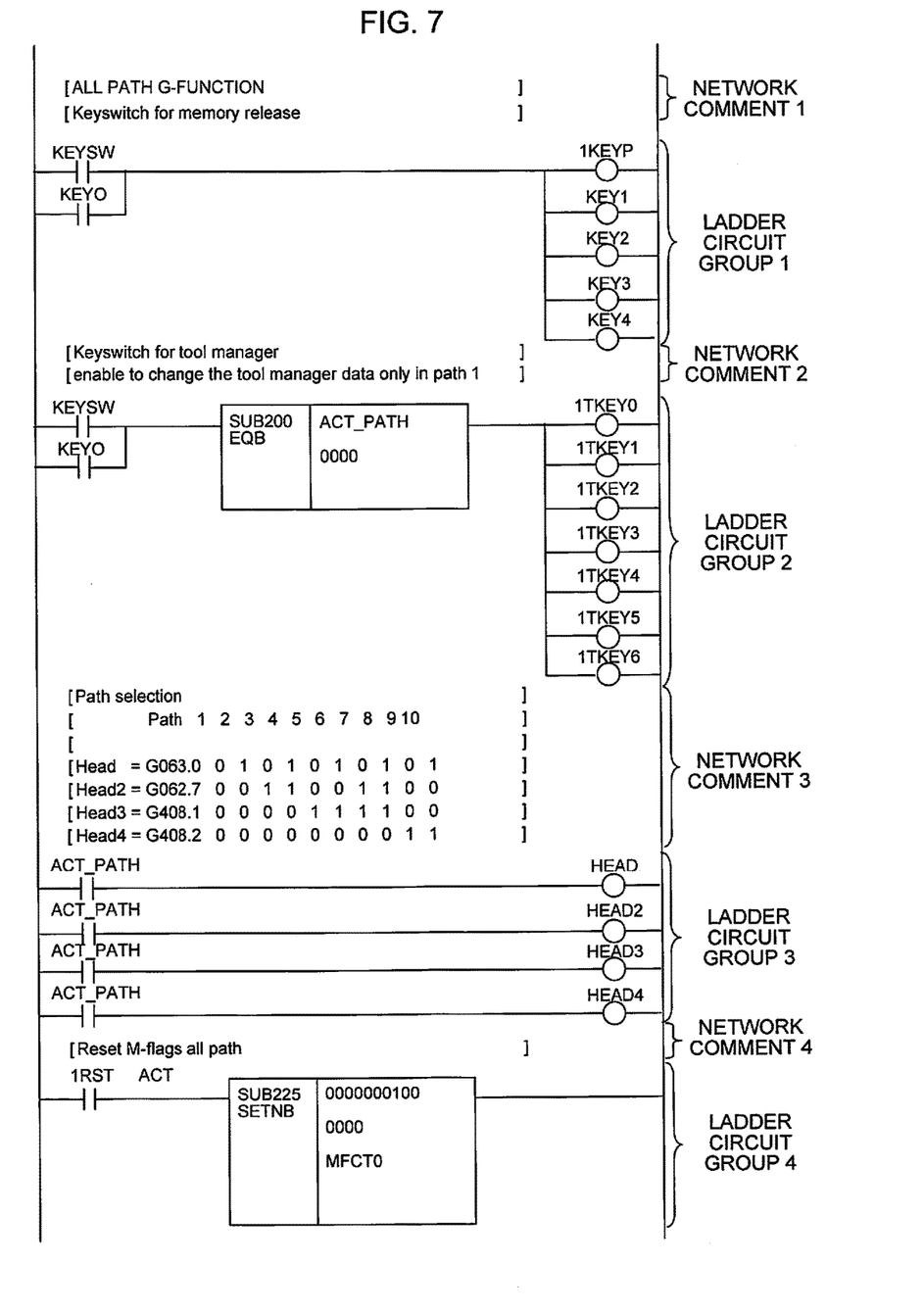
FIG. 7 is a diagram illustrating an example of a ladder program.

FIG. 7 illustrates a display example of a ladder program in which a network comment serving as a sort of comment is registered. In FIG. 7, a network comment including an explanation related to a ladder circuit is displayed above each of ladder circuits configuring a ladder program.

Figure 8:
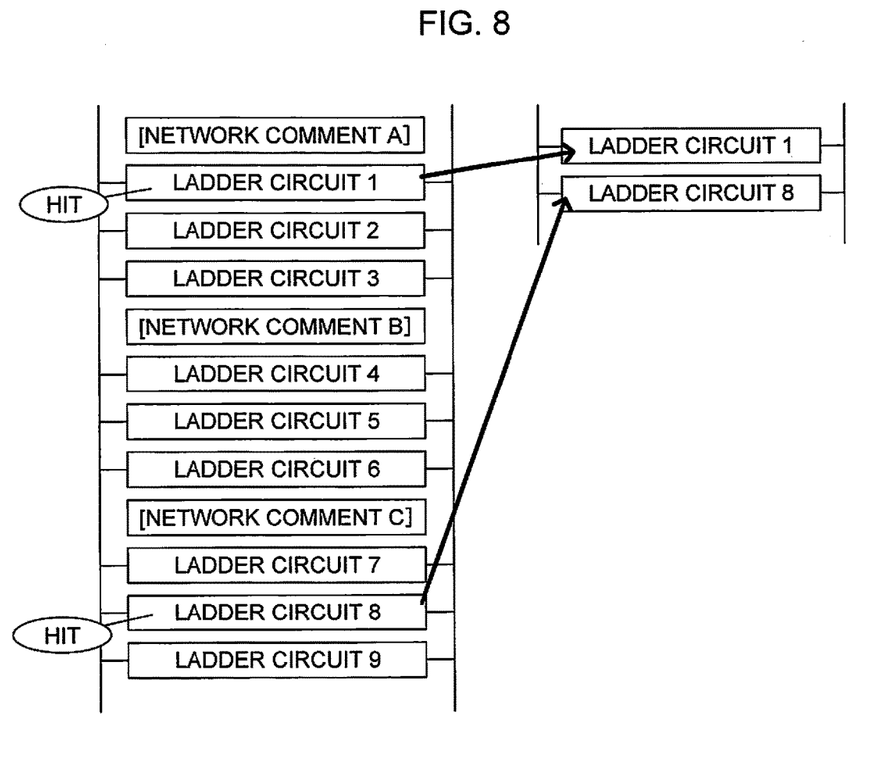
FIG. 8 is a diagram illustrating an example in which ladder circuits satisfying a search condition are acquired from all ladder programs and displayed in a list form according to a related art.

Generally, as a search of a contact point of a ladder circuit, there are a method of jumping to a ladder program satisfying a search condition and displaying the ladder program and a method of acquiring ladder circuits satisfying a search condition from all ladder programs and displaying a list of acquired ladder circuits. FIG. 8 illustrates an example in which a search result is displayed on a list form in the latter case. As illustrated in FIG. 8, in the method of displaying a list of ladder circuits hit by search as a search result, it is easy to understand an overview of the search result, whereas since only the ladder circuits satisfying the search condition are displayed, there are cases in which it is difficult to determine a process performed by the ladder circuit and a position thereof.

In this case, it is necessary for the user to display a portion around an original position of a searched ladder circuit again and check processing content based on previous and subsequent ladder circuits, a previously note comment, or the like. As a result, it is necessary to perform a work of switching the search result list screen and the ladder screen and checking processing content of the ladder in order to search for a desired ladder circuit many times, and such a work is a big burden on the user.

SUMMARY OF THE INVENTION

In this regard, it is an object of the present invention to provide a ladder program editing device having a function of displaying a network comment on a search result display screen.

In a ladder program editing device according to the present invention, it is possible to add or display a schematic explanatory note of processing content in a ladder program, and when, for example, an address or a symbol in the ladder program is searched, and a list of searched ladder circuits is displayed, a schematic explanatory note closest to the searched ladder circuit is displayed together, and thus it is possible to help understanding of the displayed ladder circuit.

A ladder program editing device according to the present invention has a function of displaying a ladder circuit satisfying a search condition for searching a ladder program serving as a search target based on the search condition designated by a user. The ladder program editing device includes a search unit configured to extract the ladder circuit satisfying the search condition from the ladder program and a network comment associated with the extracted ladder circuit and a search result display unit configured to display the network comment in a display state associated with the ladder circuit when the ladder circuit extracted by the search unit is displayed.

The search unit can extract a nearest network comment displayed above the ladder circuit on a screen on which the ladder program is displayed as the network comment associated with the ladder circuit.

The search result display unit can display the network comment above each ladder circuit.

According to the present invention, when a list of ladder programs satisfying the search condition is displayed, the ladder circuit is displayed together with the network comment associated with the ladder circuit, and thus it is easy to determine a process that is undertaken by the ladder circuit, and it is possible to efficiently pick out a desired ladder circuit from the list. Further, the frequency in which switching between the search result screen and the ladder screen is performed to check processing content of the ladder is reduced, and thus it is possible to efficiently edit the ladder program.

BRIEF DESCRIPTION OF THE DRAWINGS

The above and other objects and features of the present invention will become more apparent to those of ordinary skill in the art by describing in detail preferred embodiments thereof with reference to the attached drawings in which.

DETAILED DESCRIPTION OF THE PREFERRED EMBODIMENTS

A ladder program editing device according to the present invention includes (a) a unit that searches for a nearest network comment positioned above ladder circuits satisfying a search condition and stores positions of the ladder circuits and a position of a corresponding network comment when a search result is acquired, and (b) a unit that displays the ladder circuits and the network comment together using the stored positions of the ladder circuits and the stored position of the corresponding network comment when the search result is displayed in a list form, wherein, when the search result is displayed in the list form, the network comment associated with the ladder circuit satisfying the search condition is added. As a result, since a network comment having high relevance may be displayed on the search result list together with the ladder circuit, it is easy to understand the list display of the ladder program search result.

Figure 1:
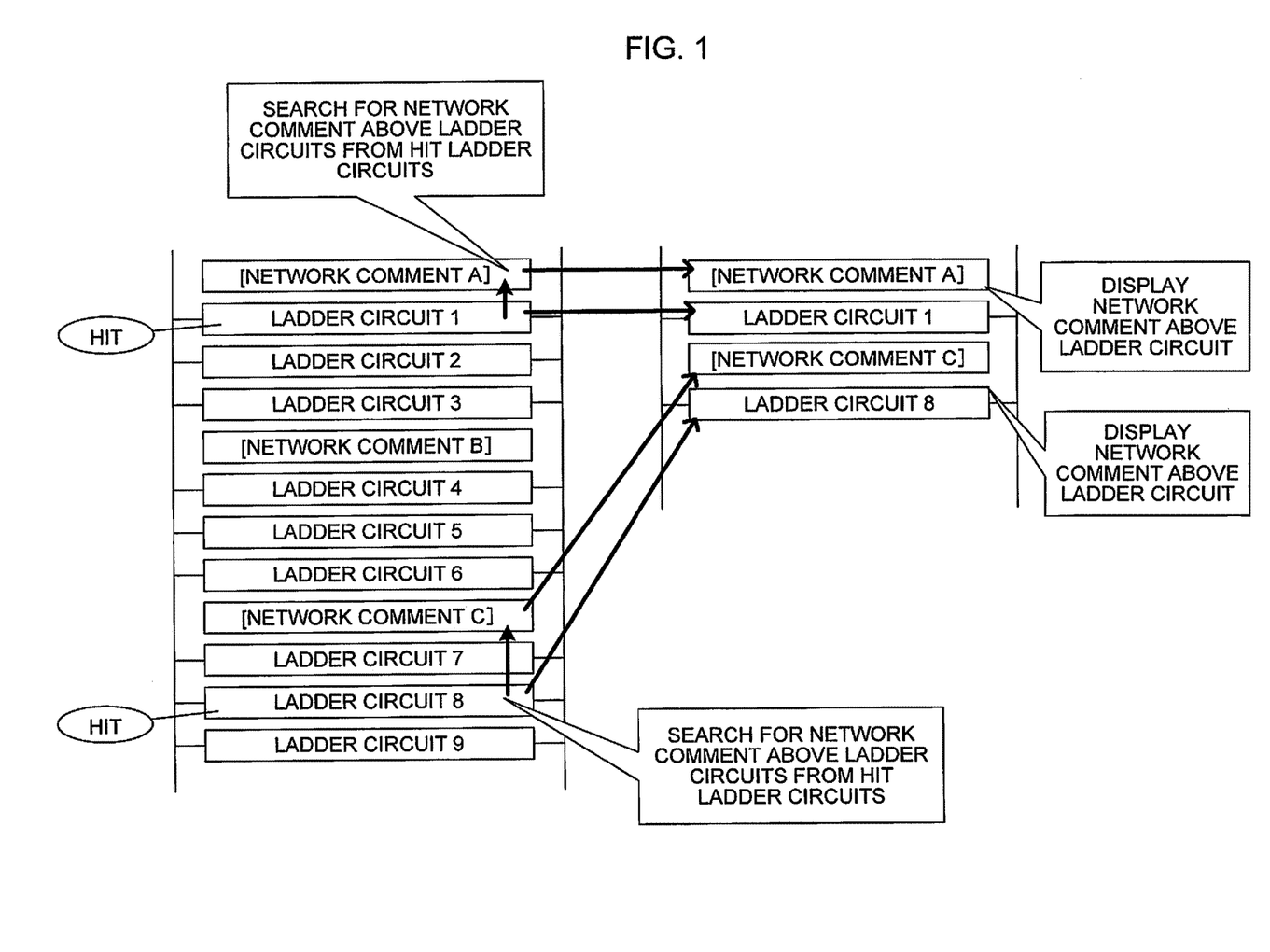
FIG. 1 illustrates an example of a display screen on which a search result list is displayed through a ladder program editing device according to the present invention.

FIG. 1 illustrates an example of a display screen on which a search result list is displayed through a ladder program editing device according to the present invention.

The ladder program editing device according to the present invention searches for and extracts a nearest network comment above a ladder circuit together when the ladder circuit satisfying a search condition is found. Then, when the searched ladder circuit is displayed, the network comment searched together with the ladder circuit is displayed above the ladder circuit. As a result, the user can view the network comment displayed at the same time as each searched ladder circuit and easily understand a process performed by the ladder circuit, and thus the user can efficiently find a desired ladder circuit and can efficiently edit the ladder program.

Figure 2:
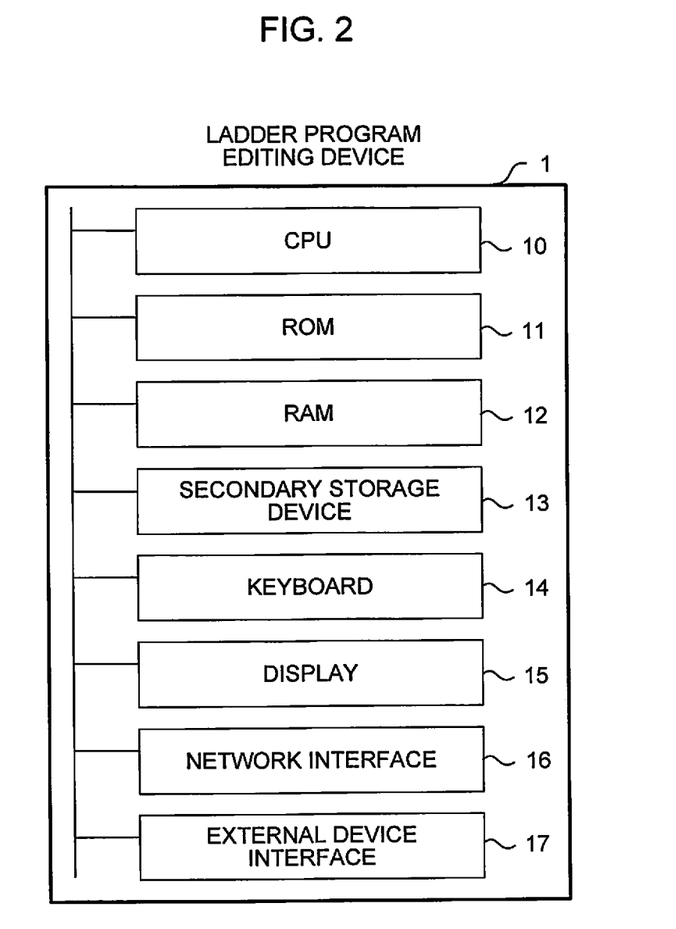
FIG. 2 is a block diagram illustrating main parts of a ladder program editing device according to an embodiment of the present invention that provides a search result list display function described above with reference to FIG. 1.

FIG. 2 is a block diagram illustrating main parts of the ladder program editing device according to an embodiment of the present invention that provides the search result list display function described above with reference to FIG. 1.

A ladder program editing device 1 includes a CPU 10, a ROM 11, a RAM 12, a secondary storage device 13, a keyboard 14, a display 15, a network interface 16, and an external device interface 17.

The CPU 10 with which the ladder program editing device 1 is equipped is a processor that controls the ladder program editing device 1 in general, and reads a system program stored in the ROM 11 via a bus and controls the ladder program editing device 1 according to the read system program. The system program includes a program for displaying a search result, each process to be described using flowcharts which will be described later is performed by executing the program, and the search result list display function of the ladder program editing device 1 is provided to the user.

The RAM 12 includes a work memory region in which temporary calculation data, display data to be displayed on the display 15, and various data input from an input device such as the keyboard 14 are stored and a region in which program data of a sequence program such as a ladder program serving as an edit target is stored. In the RAM 12, a region in which various kinds of tables such as a search result table which will be described later are stored is secured when the program of the search result list display function of the ladder program editing device 1 is executed.

The secondary storage device 13 is configured with a non-volatile storage device such as a hard disk device, a memory card, or a USB memory or a battery backed-up non-volatile memory, and stores a sequence program such as a ladder program dealt with by the ladder program editing device 1 or various kinds of files such as a setting file and a parameter file.

The keyboard 14 is an input device that receives an input from the user and used for designation of the search condition or the like. The display 15 is, for example, a liquid crystal display device or a touch panel for displaying an internal state of the ladder program editing device 1, the ladder program, the search result list, or the like.

A network such as a LAN or a WAN is connected to the network interface 16, and transmission and reception of the sequence program such as the ladder program with an external device are performed through the network interface 16.

An input device such as a mouse (not illustrated) or various external devices that operate in collaboration with the ladder program editing device 1 is connected to the external device interface 17.

An example in which the ladder program editing device 1 of the present embodiment stores ladder programs of a search target, a ladder circuit satisfying the search condition among them, position information of a network comment closest to the ladder circuit in a search result table, and displays a search result list using the position information stored in the search result table will be described below.

Figure 3:
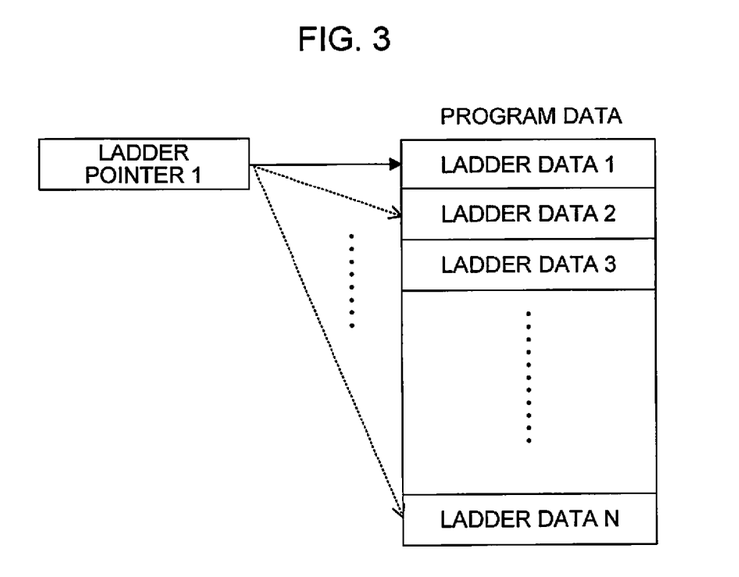
FIG. 3 is a diagram illustrating program data of a ladder program stored in a RAM of the ladder program editing device of FIG. 2.

FIG. 3 is a diagram illustrating program data of the ladder program stored in the RAM 12 of the ladder program editing device 1.

The "program data" is data indicating the ladder program serving as the search target and configured such that "ladder data" serving as the ladder circuit or the network comment are arranged. Each ladder circuit is indicated as one piece of "ladder data," but the consecutive network comments on the ladder program are defined as one piece of "ladder data." A "ladder pointer" is used to indicate the position of the ladder data in the program data.

Figure 4:
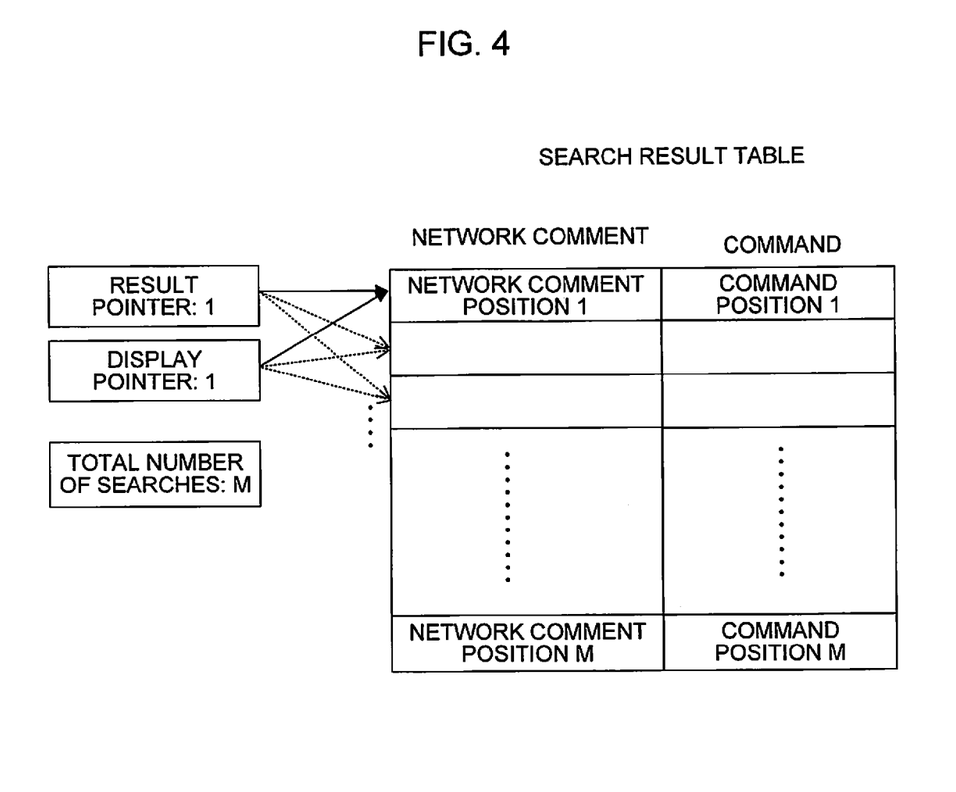
FIG. 4 is a diagram illustrating a search result table stored in a RAM of the ladder program editing device of FIG. 2.

FIG. 4 is a diagram illustrating the search result table stored in the RAM 12 of the ladder program editing device 1.

The "search result table" is used to store information related to the ladder circuit satisfying the search condition. A set of a "network comment position" and a "command position" are stored in each line of the "search result table." A "result pointer" is used to indicating a position of a line in which the set of the "network comment position" and the "command position" is stored in the "search result table." The "total number of searches" stores the total number of sets of the "network comment position" and the "command position" stored in the "search result table." A "display pointer" is used to indicate a line in which the set of the "network comment position" and the "command position" is stored in the "search result table" when the search result list is displayed.

A search result list display is implemented by the following processes:
- a "search process" of extracting the ladder circuit satisfying the search condition from the ladder data and storing the information thereof; and
- a "search result list display process" of displaying a list of ladder circuits as a search result based on the information of the ladder circuit stored by the search process.

Figure 5:
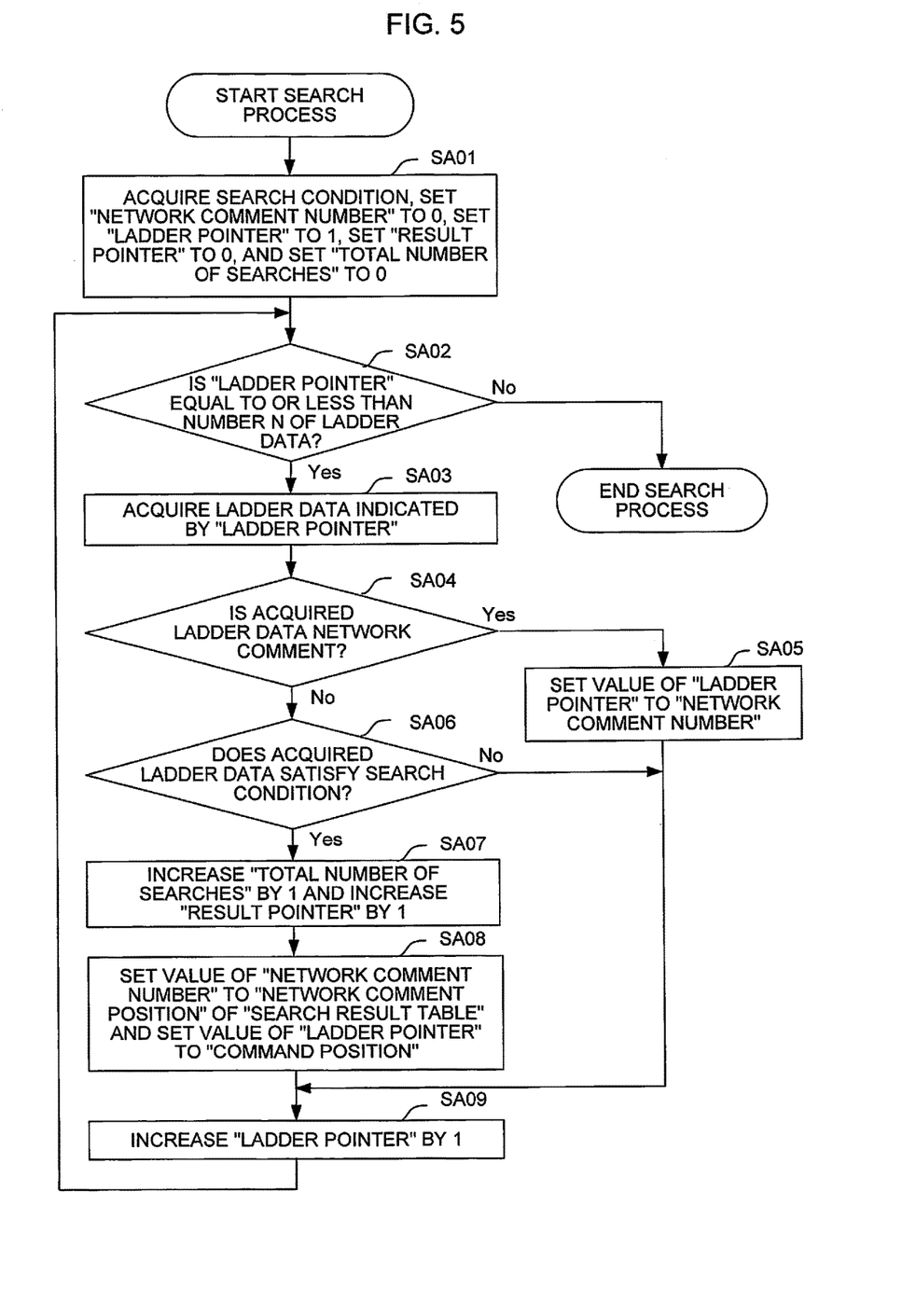
FIG. 5 is a flowchart illustrating the flow of a search process executed on the ladder program editing device of FIG. 2.

FIG. 5 is a flowchart illustrating the flow of the "search process" executed on the ladder program editing device 1.

[Step SA01] The search condition input by the user is acquired, and an initial setting of the search process is performed. In the initial setting of the search process, a "network comment number" is set to 0, the "ladder pointer" is set to 1, the "result pointer" is set to 0, and the "total number of searches" is set to 0.

[Step SA02] It is determined whether or not the "ladder pointer" is equal to or less than the number N of "ladder data" including the "program data" serving as the search target. When the "ladder pointer" is equal to or less than N, the process proceeds to step SA03, and when the "ladder pointer" is larger than N, the search of the "program data" ends, and thus the search process ends.

[Step SA03] The "ladder data" at the position indicated by the "ladder pointer" in the "ladder program" is acquired.

[Step SA04] It is determined whether or not the "ladder data" acquired in step SA03 is the network comment. When the "ladder data" is the network comment, the process proceeds to step SA05, and when the "ladder data" is not the network comment, the process proceeds to step SA06.

[Step SA05] A current value of the "ladder pointer" is set to the "network comment number."

[Step SA06] It is determined whether or not the "ladder data" acquired in step SA03 satisfies the search condition. When the "ladder data" acquired in step SA03 satisfies the search condition, the process proceeds to step SA07, but when the "ladder data" acquired in step SA03 does not satisfy the search condition, the process proceeds to step SA09.

[Step SA07] The "total number of searches" is increased by 1, and the "result pointer" is increased by 1.

[Step SA08] In a line indicated by the "result pointer" of the "search result table," a value of the "network comment number" is set to the "network comment position," and a value of the "ladder pointer" is set to the "command position."

[Step SA09] The "ladder pointer" is increased by 1, and the process returns to step SA02.

Through the search process, the positions of all the ladder circuits satisfying the search condition in the ladder program are extracted from the ladder program serving as the search target, the position of the network comment above the ladder data in the ladder program is also extracted, and these extracted positions are stored in the search result table as a set.

Figure 6:
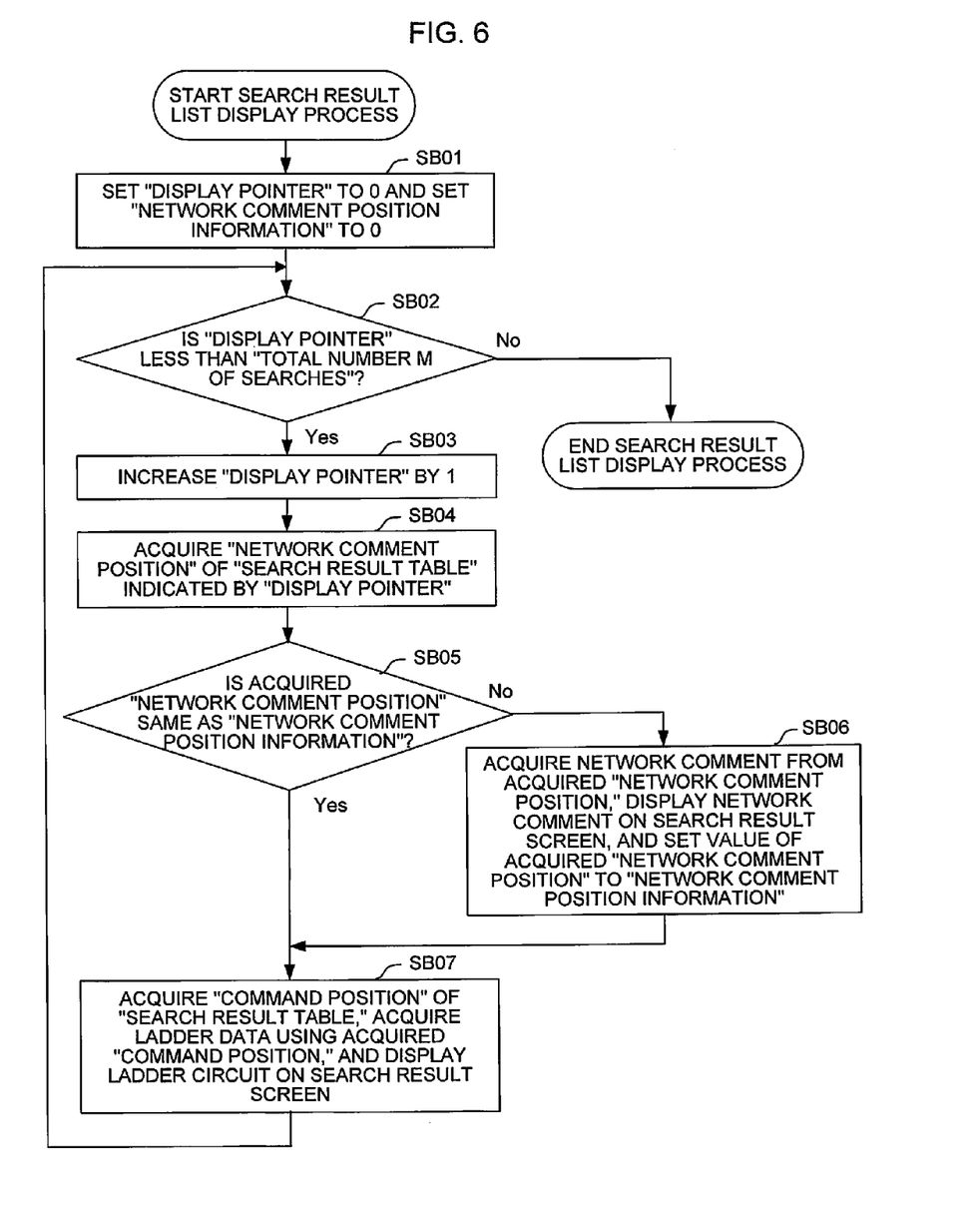
FIG. 6 is a flowchart illustrating the flow of a search result list display process executed on the ladder program editing device of FIG. 2.

FIG. 6 is a flowchart illustrating the flow of the "search result list display process" executed on the ladder program editing device 1, and through this process, a list of search results is displayed based on the position (the command position) of the ladder circuit and the position of the network comment stored in the search result table obtained as a result of the "search process" described above with reference to the flowchart of FIG. 5.

[Step SB01] An initial setting of the search result list display process is performed. In the initial setting, the "display pointer" is set to 0, and "network comment position information" is set to 0.

[Step SB02] It is determined whether or not the "display pointer" is less than the "total number of searches" M serving as the number of search results stored in the "search result table." When the "display pointer" is less than M, the process proceeds to step SB03, but when the "display pointer" is equal to or larger than M, the display of the data in the search result table ends, and thus the search result list display process ends.

[Step SB03] A value of the "display pointer" is increased by 1.

[Step SB04] The "network comment position" stored at the position of the line of the "search result table" indicated by the "display pointer" is acquired.

[Step SB05] It is determined whether or not the "network comment position" acquired in step SB04 is the same as the "network comment position information." When the "network comment position" acquired in step SB04 is the same as the "network comment position information," the process proceeds to step SB07, but when the "network comment position" acquired in step SB04 is different from the "network comment position information," the process proceeds to step SB06.

[Step SB06] In the program data, the network comment is acquired from the "network comment position" acquired in step SB04, the acquired network comment is displayed on a search result screen, and the value of the "network comment position" acquired in step SB04 is set to the "network comment position information" (as the position information of the network comment being currently displayed).

[Step SB07] The "command position" stored at the position of the line of the "search result table" indicated by the "display pointer" is acquired, the ladder data is acquired from the program data based on the acquired "command position," and the ladder circuit of the ladder data is displayed on the search result screen.

Through the search result list display process, a list of the ladder circuits (ladder circuits satisfying the search condition) stored in the search result table is displayed, and the network comment above the ladder circuits are displayed above the ladder circuits together. The user easily determines, for example, the role of each ladder circuit with reference to the displayed network comment and efficiently picks out a desired ladder circuit from the list. Thus, the switching display between the search result list display screen and the ladder program screen performed by the user in the related art is unnecessary, and it is possible to reduce efforts to do the search and a checking work of the user.

The embodiment of the present invention has been described above, but the present invention is not limited to the above embodiment, and the present invention can be implemented in various forms by appropriate modifications.

For example, in the above embodiment, the network comment above the ladder circuit is extracted from the ladder program together as the network comment associated with the ladder circuit, but the network comment associated with the searched ladder circuit may be appropriately changed according to a specification of the ladder program or the ladder program editing device. For example, in the case of a ladder program editing device of a form in which a comment is described beside each circuit, the network comment displayed beside the ladder circuit on the screen on which the ladder program is displayed may be extracted together as the network comment associated with the ladder circuit.

Further, in the above embodiment, when the search result list is displayed, the network comment is displayed above the display position of the searched ladder circuit, but the network comment can be displayed in various display states in which the relation between the ladder circuit and the network comment is understood, for example, the network comment may be displayed below the searched ladder circuit, may be displayed beside the searched ladder circuit, or may be displayed in the form of a speech balloon.

The process flows of list display process of search process and search result and the data structures of the ladder program, the search result table, and the like are not limited to the above examples, and the process flow or the data structure may be changed within the design scope as long as the object of the present invention can be achieved, and, for example, a network comment having high relevance may be displayed on the search result list display screen together with the ladder circuit.

The invention claimed is:

1. A ladder program editing device having a function of displaying a ladder circuit satisfying a search condition for searching ladder data serving as a search target based on the search condition designated by a user, comprising:
   the ladder data comprising a plurality of ladder circuits and at least one network comment associated with each of the plurality of ladder circuits, wherein each of the plurality of ladder circuits and the corresponding at least one network comment are stored in an order of a program sequence;
   a search unit configured to distinguish and identify the at least one network comment from the at least one ladder circuit of the plurality of ladder circuits in the ladder data, extract the at least one ladder circuit satisfying the search condition from the ladder data and obtain the at least one network comment above the at least one extracted ladder circuits in the order of the program sequence as the network comment associated with the extracted ladder circuit; and
   a search result display unit configured to display the at least one network comment associated with the at least one extracted ladder circuit when the at least one extracted ladder circuit is displayed on a screen, wherein the search unit extracts a nearest network comment displayed above the at least one ladder circuit on a screen on which the at least one ladder program is displayed as the at least one network comment associated with the at least one ladder circuit.

2. The ladder program editing device according to claim 1,
   wherein the search result display unit displays the network comment above the at least one extracted ladder circuit.

3. The ladder program editing device according to claim 1, further comprising:
   a storage unit configured to store one or more of ladder circuits and one or more of corresponding network comments, and
   a search result table generated by the search unit and stored in the storage unit, and containing
      a network comment location data that corresponds to a location of the network comment in the storage unit; and
      a command location data that corresponds to a location of ladder circuit in the storage unit.

* * * * *